United States Patent [19]

Cline

[11] Patent Number: 4,506,311
[45] Date of Patent: Mar. 19, 1985

[54] LIGHTNING DIVERTER STRIP WITH DIAMOND-SHAPED CONDUCTING SEGMENTS

[75] Inventor: Jay D. Cline, Ft. Lauderdale, Fla.

[73] Assignee: Dayton-Granger, Inc., Ft. Lauderdale, Fla.

[21] Appl. No.: 534,917

[22] Filed: Sep. 22, 1983

[51] Int. Cl.³ ............................................... H05F 3/00
[52] U.S. Cl. .................................. 361/218; 361/118; 361/130; 244/1 A
[58] Field of Search ............... 361/117, 118, 218, 130; 244/1 A

[56] References Cited

U.S. PATENT DOCUMENTS

| | | | |
|---|---|---|---|
| 501,114 | 7/1893 | Thomson | 361/118 |
| 2,032,566 | 3/1936 | Earle | 361/130 X |
| 3,416,207 | 12/1968 | Amason et al. | 361/321 |

Primary Examiner—A. D. Pellinen
Attorney, Agent, or Firm—Biebel, French & Nauman

[57] ABSTRACT

A lightning diverter strip is provided with button elements in the form of diamond-shaped conducting segments which arranged longitudinally on the strip in spaced-apart relation, with the sharp corners of each of the button conductive elements in longitudinal alignment with each other and with the opposite corners presented along the edges of the strip. The spacings of the conductive elements at the corners may be varied so that some of the elements are spaced more closely together than are other ones of the elements, to provide a lightning diverter strip having a lower break-down voltage potential.

3 Claims, 3 Drawing Figures

LIGHTNING DIVERTER STRIP WITH DIAMOND-SHAPED CONDUCTING SEGMENTS

This invention relates to lightning diverters and more particularly to an improvement in strip type lightning diverters of the kind disclosed in the U.S. patent of Amason et al U.S. Pat. No. 3,416,027, issued Dec. 10, 1968.

The above-defined Amason et al patent discloses lightning diverter strips which include special segments of conductive metal mounted along the length of a supporting fiber glass, tape or the like, and resistively coupled to each other. The embodiments include metal conductive segments in the form of circular metal buttons or rivets, longitudinally aligned segments of wire, and rectangular metal plates. The button embodiment has been adapted to successful commercial practice in a form in which a glass laminate strip supports a plurality of closely spaced circular buttons or plates on one side of the strip electrically connected to small rectangular bases on the other side of the strip, by metal plated openings formed through the oppositely disposed metal parts and through the strip itself. Small rectangular bases are, in turn, resistively coupled to each other using resistance inks, such as carbon inks.

Such devices have found widespread use on aircraft radomes and the like and successfully divert electrical energy from lightning strikes, lightning attachments or the like by ionizing the air between the metal segments and forming a low impedance path over the radome surface, to a ground. Such devices are relatively transparent to radar frequencies and therefore do not materially degrade the performance of the radar.

A need, however, exists for lightning diverter strips which are more susceptible to lightning attachments from the side, and which have reduced break-down resistance between the individual conducting segments of the strip.

SUMMARY OF THE INVENTION

The present invention is directed to an improvement to the embodiments shown in the above identified Amason et al patents, and employ, along the upper or outer surface of a strip, a plurality of metal conducting segments which present to each other, in spaced relation, one or more electrical points, as distinguished from the circular edges of buttons as used in the prior art device. In the preferred embodiment of this invention, the points are generated by forming the buttons in a rectangular or square configuration, and aligning the corners of the buttons longitudinally to each other, in spaced relation, so that the buttons take on a diamond shaped appearance when viewed in relation to the top of the strip. The preferred configuration provides not only the advantage of a lower break-down voltage between the conductive segments with the same spacing, as compared to a circular conductive elements, but the strip further tends to capture lightning strikes from the side more readily due to the fact that the side of the strip now presents a corresponding series of sharp points along each edge. Accordingly, the lightning diverter strip of the present invention has been shown to ionize at lower voltages, thereby providing increased protection for the internal radar or other equipment housed within the protected aircraft radome.

The invention includes a further feature not disclosed or suggestion in the above-identified patent of Amason et al, and that consists of an arrangement by which the spacing between the individual conductive segment is not uniform, but rather is varied for the purpose of reducing the break-down voltage across the strip and providing more reliable operation. Specifically, it has been found that where a strip has been made in accordance with the teachings of Amason et al, if the individual conductive segments are uniformly spaced along the length of the strip, then when a voltage is applied from end to end across the strip, the various spacings or gaps between the conductive buttons or segments will display substantially equal voltages. Thus, all of these gaps tend to break down at approximately the same time and at a relatively high voltage. However, if portions of the diverter strip are provided with conductive segments which are spaced closer together than other portions, the break-down voltage for that portion or segment containing the closer spacing will be lower than that of the remaining strip and, as a result, the portion or segment with closer spacing between the conductive segments will tend to break down first, thus applying the entire end-to-end voltage over the remaining gaps that have not broken down. The total strip will break down in segments, until the final gaps are broken down, when the entire voltage becomes impressed across them. Such larger voltage may normally be considered as that which had been first applied across the entire strip prior to ionization or break down of the narrower or more closely spaced gaps. In this manner, a strip constructed according to this invention will exhibit break down by progressive break-down of strip segments, at an effectively lower voltage than that where the gaps are all uniformly spaced even though the gaps may be very closely spaced, thus providing additional protection for the underlying electronic and radome components. While the variable spacing concept has particular applicability to the diamond-shaped metal conducting segments forming the preferred embodiment of this invention, this aspect of the invention may also be applied with advantage to the circular configured buttons of Amason et al.

It is accordingly an important object of this invention to provide a lightning diverter strip including a plurality of longitudinally spaced conductive metal segments arranged along a strip, in which the segments present to each other spaced apart points, characterized by a lower threshold ionization voltage as compared to circular metal conductive segments.

Another object of this invention is the provision of a lightning diverter strip employing diamond shaped conductive segments thereon.

It is a further object of the invention to provide a lightning diverter strip of the kind identified above, incorporating a plurality of spaced apart metal conductive segments, in which the spacing between individual conducting segments is varied along the longitudinal length of the strip to provide a lower break-down voltage across the length of the strip.

A still further object of the invention is the provision of a diverter strip incorporating a plurality of spaced apart metal conducting segments, which may preferably be of a diamond-shaped configuration, in which discrete sections or segments of the strip have longitudinal spacings which differ from other such sections or segments of the strip, to the end that some of the segments are provided with closer spacings than are other spacings so that the segments with closer spacings will break down first, thereby applying the entire voltage across the segments with wider spacings.

These and other objects and advantages will be apparent from the following description, the accompanying drawings and the appended claims.

DESCRIPTION OF PREFERRED EMBODIMENT

Figure 1:
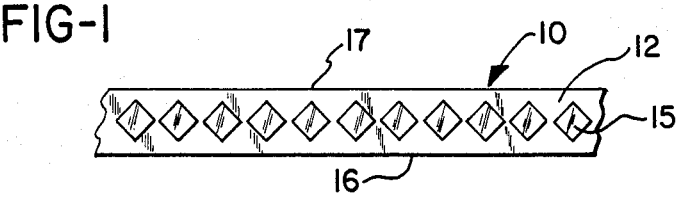
FIG. 1 is an elevational view of a lightning diverter strip according to this invention.

Referring to the figures of the drawing which illustrate a preferred embodiment of the invention, a lightning diverter strip made according to this invention is illustrated generally at 10 in FIG. 1. The strip 10 includes a base or substrate 12 of relatively thin flexible di-electric material, such as a strip of woven glass fibers filled with a suitable epoxy material, which provides strength to the strip and support for the individual metal buttons thereon. As shown, the buttons or conductive plates 15 are formed as small squares and give the appearance of triangular plates when viewed in FIG. 1 in that the axis or alignment of the sharp corners of the rectangles is longitudinally of the strip along center line substrate 12 between the sides 16 and 17.

Figure 2:
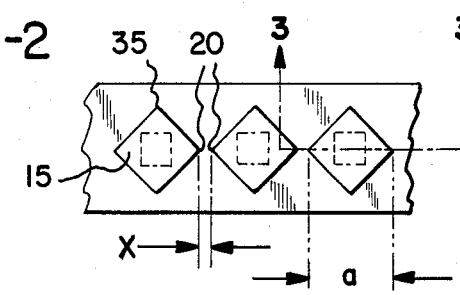
FIG. 2 is an enlarged fragmentary portion of the strip of FIG. 1.

The plates 15 thus are formed with sharp points or corners 20 which face each other but which are electrically and physically separated by a dimension illustrated by the letter X in FIG. 2. The separation of the points 20 assures that the pads 15 do not contact each other, and provide for ionization of the space therebetween. While the size of the individual plates 15 is not critical, in the preferred embodiment each plate may have a point to point dimension "a" of approximately 0.100" to 0.127". The smaller sized plates 15 may be preferred in instances where the diverter strip is used with radars having very high frequencies, since this strip will tend to be more transparent to such high frequencies than would a strip which is configured with the somewhat larger plates 15. Thus, the strip may conveniently be made in two versions, one which uses plates having a dimension of 0.100" transversely from point to point, particularly suitable for very high frequency radar systems, and a dimension of 0.127" transversely from point to point for use with radars and radomes of a more conventional lower frequency.

The individual array of spaced apart metallic conductors in the form of the buttons or plates 15 are positioned on the exposed outer surface of the strip 10, and thus are exposed to atmospheric conditions. The back side of the base or substrate 12 is provided with a corresponding series of small rectangular pads 25, also formed of metal, positioned opposite each of the plates 15. The rectangular pads are positioned essentially square with the sides 16 and 17 of the strip 10, as shown in the outlines thereof in FIG. 2. The pads 25 provide the means for coupling the plates 15 to a resistive coating 28 applied to the back of the base 12.

Figure 3:
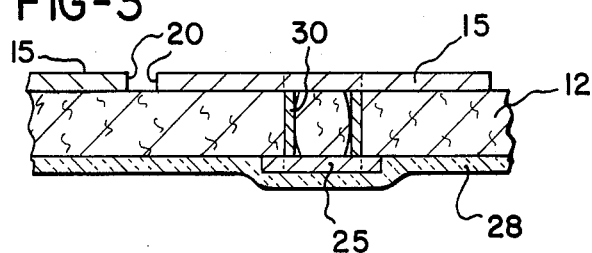
FIG. 3 is an enlarged fragmentary section taken generally along the line 3—3 of FIG. 2.

In manufacture, a very small hole is drilled through the copper plate 15, the base 12 and the copper pad 25. It is then plated through by copper material as indicated by the plated through material 30 shown in section in FIG. 3, by means of which the upper and lower conductive parts become electrically attached to each other. The hole may then be filled with epoxy and the plates 15 nickel plated to close the small hole in the plate 15. Alternatively, buttons in the form of rivets as disclosed in connection with the embodiment of FIG. 2 of the Amason et al patent may be used. The inner surface of the strip 12, is coated with a conductive or resistance material 28 usually in the form of a resistance ink, to provide the desired resistance coupling between the individual buttons as taught in the Amason et al patent, and then may be coated with non-conductive neoprene or the like if desired. Preferably, the resistance of the coating 28 is in the order of approximately 100K ohms to 10M ohms per foot.

As previously noted, the dimension "x" is identified on FIG. 2 to represent the spacing between the individual conductive segments. As noted in the summary above, it is preferred to provide an arrangement by which the spacing as defined by the letter "x" is not uniform, but one which varies along the longitudinal length of the strip. A typical strip used to protect a radome may be in excess of three feet long. Good results have been obtained, starting from the ground end of the strip, by providing a first 6" segment of the strip with a spacing between the segments of approximately 0.003", by providing a second 6" strip segment which has a spacing or gap between the conductive segments or plates of approximately 0.007", a third 6" strip segment with spacings of 0.011", and a fourth 6" segment for a spacing of 0.015", then repeating the pattern with a fifth segment, where applicable, with a spacing of 0.003", etc. It is within the scope of this invention to employ a greater or fewer number of such strip segments, and to employ different spacings than those identified above as a preferred embodiment. For example, the spacing between conductive segments could be randomly varied along the longitudinal length of the strip with the result that a substantial portion of the gaps defined by the letter "X" will break down before others, thereby redistributing the voltage gradient across the strip and achieving the lower break down potential described above. However, for production purposes, it is preferred to provide the strip having discrete segments with uniform spacing along such segments. While spacings of closer than 0.003" may be used for a portion of the gaps or one or more of such segments, such closer spacings provide increased problems with manufacturing tolerances to assure that the conductive plates do not actually touch, and for the purposes of radome protection, this has been found to be an acceptable minimum. Further, it is preferred to provide discrete segments, as defined above, with uniform spacings and to vary such spacings between or among segments rather than within the segments, which thereby provides for a break down over a defined segment, in an orderly progression, to provide more uniform and dependable results relating to the protection of the underlying radome.

When the points of the conductive plates 15 are oriented in longitudinal alignment as illustrated by the corners 20 in FIG. 2, the outside corners 35 are presented respecively toward the longitudinal edges 16 and 17. Therefore, the sharp points formed along the edges tends to capture lightning strikes from the side more readily than round or circular buttons, due to the sharp points 35 formed along the edges, since the gas or air at sharp points tend to break down at lower voltages. Further, since the lightning diverter using the diamond or rectangular shaped plates 12 provide adjacent edges in the form of spaced apart sharp points 20, the entire diverter strip ionizes at lower voltages and thereby provides increased protection for the internal radar components housed within the radome, and for the radome itself.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lightning diverter strip including a plurality of conductive plates resistively coupled on a substrate base, arranged longitudinally on a strip in spaced apart relation, the improvement comprising each of said plates formed in a generally rectangular shape substantially flush with the top surface of said strip, said plates being oriented with respect to each other such that a corner of one plate is in longitudinal alignment with a corner of an adjacent plate so that the break-down potential between adjacent plates is reduced.

2. The diverter strip of claim 1 in which said plates are formed as a true square with sharp corners in longitudinal alignment and opposite corners presented along the edges of said strip, for enhancing lightning attachment along the sides thereof.

3. The diverter strip of claim 2 in which said plates have a dimension of about 0.100" to 0.127" point-to-point.

* * * * *